United States Patent
Iki et al.

(10) Patent No.: US 10,095,093 B2
(45) Date of Patent: Oct. 9, 2018

(54) PROJECTION DISPLAY DEVICE AND ELECTROOPTICAL DEVICE

(71) Applicant: SEIKO EPSON CORPORATION, Tokyo (JP)

(72) Inventors: Takunori Iki, Azumino (JP); Yoichi Momose, Matsumoto (JP); Hiroaki Yanai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/640,881

(22) Filed: Jul. 3, 2017

(65) Prior Publication Data

US 2018/0031954 A1 Feb. 1, 2018

(30) Foreign Application Priority Data

Jul. 28, 2016 (JP) ................................ 2016-148117

(51) Int. Cl.
   *G03B 21/00* (2006.01)
   *G02B 26/10* (2006.01)
   *G02B 26/08* (2006.01)

(52) U.S. Cl.
   CPC ....... *G03B 21/008* (2013.01); *G02B 26/0841* (2013.01); *G02B 26/101* (2013.01)

(58) Field of Classification Search
   CPC . G02B 21/008; G02B 26/0841; G02B 26/101
   USPC .......................................... 359/501; 348/771
   See application file for complete search history.

(56) References Cited

U.S. PATENT DOCUMENTS

| | | | | |
|---|---|---|---|---|
| 9,709,800 | B2* | 7/2017 | Uchiyama | G02B 26/0841 |
| 2006/0245031 | A1* | 11/2006 | Gong | G02B 26/0841 359/291 |
| 2009/0103158 | A1* | 4/2009 | Shirai | G02B 26/0841 359/221.2 |
| 2015/0070749 | A1 | 3/2015 | McDonald et al. | |
| 2016/0266377 | A1 | 9/2016 | McDonald et al. | |
| 2017/0315344 | A1* | 11/2017 | Hanaoka | G02B 26/0833 |

FOREIGN PATENT DOCUMENTS

JP     2004-133312 A     4/2004

* cited by examiner

*Primary Examiner* — William R Alexander
*Assistant Examiner* — Grant Gagnon
(74) *Attorney, Agent, or Firm* — Oliff PLC

(57) ABSTRACT

An electrooptical device of a projection display device includes a first driving element and a second driving element. The first driving element switches a position of a first mirror between a first turn-on position, in which the first mirror reflects a first light-source light beam from a first irradiation direction in an ON-direction, and a first turn-off position, in which the first mirror reflects the first light-source light beam in a first OFF-direction. The second driving element switches a position of a second mirror between a second turn-on position, in which the second mirror reflects a second light-source light beam in the ON-direction, and a second turn-off position, in which the second mirror reflects the second light-source light beam in a second OFF-direction.

12 Claims, 7 Drawing Sheets

| TIME PERIOD | t1 | t2 | t3 | t4 | t5 | t6 |
|---|---|---|---|---|---|---|
| FIRST LIGHT-SOURCE LIGHT L1 | (R) | (G) | (B) | (R) | (G) | (B) |
| SECOND LIGHT-SOURCE LIGHT L2 | (G) | (B) | (R) | (G) | (B) | (R) |

| TIME PERIOD | t1 | | t2 | | t3 | | t4 | | t5 | | t6 | |
|---|---|---|---|---|---|---|---|---|---|---|---|---|
| TIME PERIOD | t1-1 | t1-2 | t2-1 | t2-2 | t3-1 | t3-2 | t4-1 | t4-2 | t5-1 | t5-2 | t6-1 | t6-2 |
| FIRST LIGHT-SOURCE LIGHT L1 | (R) | | (G) | | (B) | | (R) | | (G) | | (B) | |
| SECOND LIGHT-SOURCE LIGHT L2 | (G) | (B) | (B) | (R) | (R) | (G) | (G) | (B) | (B) | (R) | (R) | (G) |

PROJECTION DISPLAY DEVICE AND ELECTROOPTICAL DEVICE

BACKGROUND

1. Technical Field

The present invention relates to a projection display device and an electrooptical device that modulate light-source light using mirrors.

2. Related Art

Examples of electronic devices including mirrors that have been developed thus far include a display device that modulates light-source light emitted from a light-source unit using an electrooptical device, called a digital micromirror device (DMD), and that projects the modulated light in an enlarged manner using an optical projection system. In such an electronic device, the light-source unit emits light-source light to the mirrors in one direction that is oblique with respect to a direction perpendicular to the mirrors. Here, the electrooptical device includes multiple mirrors swingable in the same direction and arranged in a matrix to modulate light-source light as a result of the positions of the mirrors being switched between a turn-on position, in which the mirrors reflect light-source light in an ON-direction toward the optical projection system, and a turn-on position, in which the mirrors reflect light-source light in an OFF-direction different from the ON-direction (see U. S. Patent Application Publication No. 2015/0070749 A1).

The inventors of the application have been studying to cause, in a projection display device or the like, the electrooptical device to receive various different types of light-source light beams and to cause the optical projection system to simultaneously emit the various different types of light-source light beams after modulating the light-source light beams in order to prevent or reduce interference between light beams reflected by adjacent mirrors or color breakup of the light beams. However, in order for one electrooptical device to simultaneously modulate various different types of light-source light beams, the electrooptical device has to receive the light-source light beams from different directions. However, simultaneously modulating multiple light-source light beams emitted from different directions is difficult for the electrooptical device described in U. S. Patent Application Publication No. 2015/0070749, since the multiple mirrors have the same turn-on position and the same turn-off position.

SUMMARY

An advantage of some aspects of the invention is to provide a projection display device and an electrooptical device capable of simultaneously modulating a first light-source light beam and a second light-source light beam, which are emitted from different directions.

To address the above-described problem, a projection display device according to an aspect of the invention includes an electrooptical device, a light-source unit, which emits a first light-source light beam to the electrooptical device in a first irradiation direction and emits a second light-source light beam to the electrooptical device in a second irradiation direction different from the first irradiation direction, and an optical projection system, which projects a first modulated light beam, into which the first light-source light beam is modulated by the electrooptical device, and a second modulated light beam, into which the second light-source light beam is modulated by the electrooptical device. The electrooptical device includes a first mirror that modulates light, a first driving element that swings the first mirror to switch a position of the first mirror, a second mirror that is disposed so that its surface faces in a direction the same as a direction in which the first mirror faces and that modulates light, and a second driving element that swings the second mirror to switch a position of the second mirror. The first driving element switches the position of the first mirror between a first turn-on position, in which the first mirror reflects the first light-source light beam in an ON-direction toward the optical projection system, and a first turn-off position, in which the first mirror reflects the first light-source light beam in a first OFF-direction, which is different from the ON-direction, the first irradiation direction, and the second irradiation direction. The second driving element swings the second mirror in a direction different from the direction in which the first mirror is caused to swing to switch the position of the second mirror between a second turn-on position, in which the second mirror reflects the second light-source light beam in the ON-direction, and a second turn-off position, in which the second mirror reflects the second light-source light beam in a second OFF-direction different from the ON-direction, the first irradiation direction, and the second irradiation direction.

In the invention, the first driving element drives the first mirror into a first turn-on position so that the first mirror reflects a first light-source light beam from the first irradiation direction in an ON-direction toward an optical projection system. The second driving element drives the second mirror into a second turn-on position so that the second mirror reflects a second light-source light beam from a second irradiation direction in the ON-direction toward the optical projection system. At this time, the direction in which the first mirror swings is different from the direction in which the second mirror swings. Thus, neither the first light-source light beam is reflected by the second mirror in the ON-direction nor the second light-source light beam is reflected by the first mirror in the ON-direction. Thus, controlling the positions of the multiple first mirrors and the multiple second mirrors allows the optical projection system to project modulated light into which the first light-source light beam is modulated by the first mirror and modulated light into which the second light-source light beam is modulated by the second mirror.

A projection display device according to an aspect of the invention may have a configuration in which the ON-direction is perpendicular to the first mirror when the first mirror is in a regular position in which the first mirror is stopped being driven by the first driving element, and the first irradiation direction and the second irradiation direction are inclined with respect to the ON-direction.

A projection display device according to an aspect of the invention may have the following configuration. The first driving element swings the first mirror in a first direction around a first axis, parallel to the first mirror in the regular position, so that the first mirror takes one of the first turn-on position and the first turn-off position and swings the first mirror in a first direction around a second axis, parallel to the first mirror in the regular position and crossing the first axis, so that the first mirror takes the other one of the first turn-on position and the first turn-off position. The second driving element swings the second mirror in a second direction around the first axis so that the second mirror takes one of the second turn-on position and the second turn-off position and swings the second mirror in a second direction around the second axis so that the second mirror takes the other one of the second turn-on position and the second turn-off position.

A projection display device according to an aspect of the invention may have the following configuration. The first irradiation direction is a direction from a first side toward a second side of a direction of the first axis. The second irradiation direction is a direction from the second side toward the first side of the direction of the first axis. The first driving element swings the first mirror in the first direction around the second axis so that the first mirror takes the first turn-on position and swings the first mirror in the first direction around the first axis so that the first mirror takes the first turn-off position. The second driving element swings the second mirror in the second direction around the second axis so that the second mirror takes the second turn-on position and swings the second mirror in the second direction around the first axis so that the second mirror takes the second turn-off position.

A projection display device according to an aspect of the invention may have the following configuration. The first irradiation direction is a direction from a first side toward a second side of a direction of the first axis. The second irradiation direction is a direction from a first side toward a second side of a direction of the second axis. The first driving element swings the first mirror in the first direction around the second axis so that the first mirror takes the first turn-on position and swings the first mirror in the first direction around the first axis so that the first mirror takes the first turn-off position. The second driving element swings the second mirror in the second direction around the first axis so that the second mirror takes the second turn-on position and swings the second mirror in the second direction around the second axis so that the second mirror takes the second turn-off position. In this configuration, the direction in which the first mirror in the first turn-off position reflects the first light-source light beam is the same as the direction in which the second mirror in the second turn-off position reflects the second light-source light beam. Thus, the first light-source light beam reflected by the first mirror in the first turn-off position travels in the same direction as the second light-source light beam reflected by the second mirror in the second turn-off position. Thus, these reflected light beams can be absorbed by a single light absorption device.

A projection display device according to an aspect of the invention may have the following configuration. Each of the first light-source light beam and the second light-source light beam is sequentially switched between a light beam in a first wavelength range, a light beam in a second wavelength range, different from the first wavelength range, and a light beam in a third wavelength range, different from the first wavelength range and the second wavelength range. Light beams in the same wavelength range are cycled at different timing between the first light-source light beam and the second light-source light beam. This configuration can prevent color breakup of color images displayed in a sequential manner.

A projection display device according to an aspect of the invention may have the following configuration. During a period where the first light-source light beam is a light beam in any one of the first wavelength range, the second wavelength range, and the third wavelength range, the second light-source light beam is sequentially switched from one light beam to another in the other wavelength ranges. This configuration can prevent color breakup of color images when they are displayed in a sequential manner.

In this case, the following configuration may be employed. The light-source unit includes a white light source, a color wheel, and a color separating device, the color wheel including a first area that transmits the light beam in the first wavelength range, a second area that transmits the light beam in the second wavelength range, and a third area that transmits the light beam in the third wavelength range, the color separating device operating in association with a rotation of the color wheel. The first light-source light beam is a light beam that has transmitted through the color wheel. The second light-source light beam is a light beam obtained by separating a light beam that has been reflected by the color wheel using the color separating device.

In a projection display device according to another aspect of the invention, the first light-source light beam may be a first coherent light beam, and the second light-source light beam may be a second coherent light beam having a phase opposite to a phase of the first coherent light beam. Here, the term "coherent light" refers to light including light in a state approximate to the state of coherent light, such as light emitted from a laser that oscillates in a single mode. This configuration is advantageous in that it is less likely to allow light beams emitted from a first mirror and a second mirror, which are adjacent to each other, to interfere with each other.

In a projection display device according to another aspect of the invention, the first light-source light beam may be a first linearly polarized light beam, and the second light-source light beam may be a second linearly polarized light beam whose plane of polarization is orthogonal to a plane of polarization of the first linearly polarized light beam. The projection display device having this configuration can project three-dimensional images using light beams emitted from the first mirrors and the second mirrors.

An electrooptical device according to an aspect of the invention includes a first mirror that modulates light, a first driving element that swings the first mirror to switch a position of the first mirror, a second mirror that is disposed so that its surface faces in a direction the same as a direction in which the first mirror faces and that modulates light, and a second driving element that swings the second mirror in a direction different from a direction in which the first mirror is caused to swing to switch a position of the second mirror.

In an electrooptical device according to an aspect of the invention, the first driving element swings the first mirror in a first direction around a first axis, parallel to the first mirror in a regular position in which the first mirror is stopped being driven by the first driving element, so that the first mirror takes one of a first turn-on position and a first turn-off position, and swings the first mirror in a first direction around a second axis, parallel to the first mirror in the regular position and crossing the first axis, so that the first mirror takes the other one of the first turn-on position and the first turn-off position. The second driving element swings the second mirror in a second direction around the first axis so that the second mirror takes one of a second turn-on position and a second turn-off position and swings the second mirror in a second direction around the second axis so that the second mirror takes the other one of the second turn-on position and the second turn-off position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
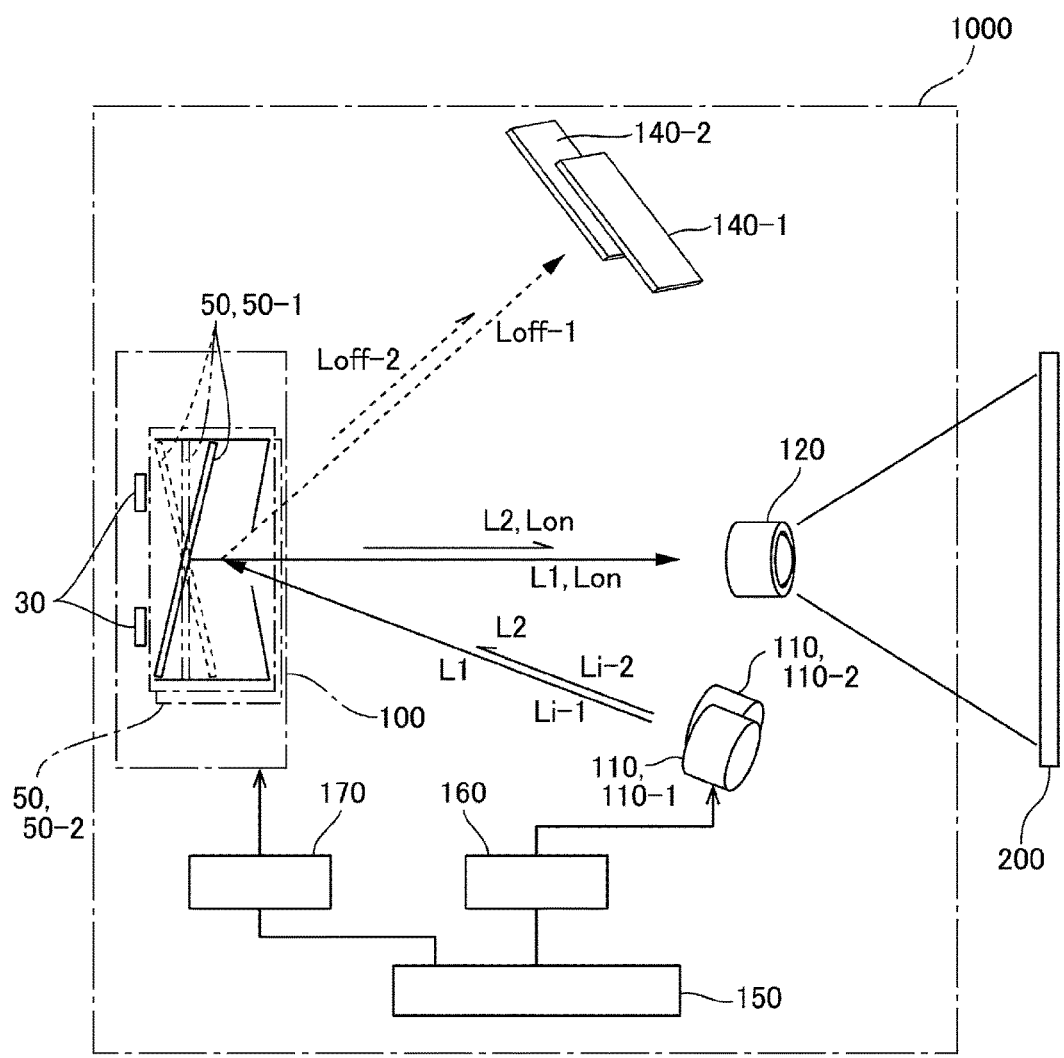
FIG. 1 illustrates a projection display device according to a first embodiment of the invention.

Referring to the drawings, embodiments of the invention are described. Layers and components are illustrated in different scales between different drawings that are referred to in the following description so that the layers or components are identifiable on each of the drawings. The number of mirrors or other components illustrated on the drawings is determined so that the mirrors or other components have a size identifiable on each drawing. However, a number of mirrors or components may be larger than the number of mirrors or components illustrated on the drawings.

First Embodiment

Entire Configuration of Projection Display Device 1000

FIG. 1 illustrates a projection display device 1000 according to a first embodiment of the invention and FIG. 1 only illustrates some of multiple mirrors 50 included in an electrooptical device 100.

The projection display device 1000 illustrated in FIG. 1 includes light-source units 110, an electrooptical device 100, which modulates light emitted from the light-source unit 110 in accordance with image information, and an optical projection system 120, which projects light modulated by the electrooptical device 100 to an object 200, such as a wall surface or a screen, in the form of a projection image. In this embodiment, the electrooptical device 100 includes light modulation mirrors 50 and driving elements 30, which drive the mirrors 50, as described below with reference to FIG. 3, FIG. 4, and FIG. 5. As described below, the driving elements 30 swing the mirrors 50 to switch the position of the mirrors 50 between a turn-on position and a turn-off position.

In this embodiment, the light-source unit 110 includes a first light-emitting unit 110-1 and a second light-emitting unit 110-2. The first light-emitting unit 110-1 emits a first light-source light beam L1 to the electrooptical device 100 in a first irradiation direction Li-1. The second light-emitting unit 110-2 emits a second light-source light beam L2 to the electrooptical device 100 in a second irradiation direction Li-2 different from the first irradiation direction Li-1. The first irradiation direction Li-1 and the second irradiation direction Li-2 are different directions but are both inclined at the same angle with respect to the direction perpendicular to the mirror 50. The light-source unit 110 is controlled by a light-source controlling unit 160 so that each of the first light-emitting unit 110-1 and the second light-emitting unit 110-2 sequentially emits red, green, and blue light beams. The electrooptical device 100 is controlled by an image controlling unit 170 so as to sequentially modulate red, green, and blue light-source light beams emitted from the light-source unit 110 and emit the modulated light beams to the optical projection system 120. In this embodiment, the light-source controlling unit 160 and the image controlling unit 170 are controlled by an upper level controller 150. The electrooptical device 100 modulates red, green, and blue light beams in synchronization with time at which red, green, and blue light beams are emitted from the first light-emitting unit 110-1 and the second light-emitting unit 110-2.

Each light-source unit 110 may emit, for example, white light beams emitted from a light source to the electrooptical device 100 through a color wheel. In this case, each of the first light-emitting unit 110-1 and the second light-emitting unit 110-2 may include a light source and a color wheel. Alternatively, the light-source unit 110 may have a configuration that includes a pair of light sources and a color wheel and in which the first light-emitting unit 110-1 emits part of light emitted through the color wheel and the second light-emitting unit 110-2 emits the other part of light emitted through the color wheel. Alternatively, the light-source unit 110 may have a configuration in which each of the first light-emitting unit 110-1 and the second light-emitting unit 110-2 includes a light-emitting device that emits a red light beam, a light-emitting device that emits a green light beam, and a light-emitting device that emits a blue light beam and these light-emitting devices are sequentially turned on to sequentially emit the red light beam, the green light beam, and the blue light beam.

Configuration of Electrooptical Device 100

Figure 2:
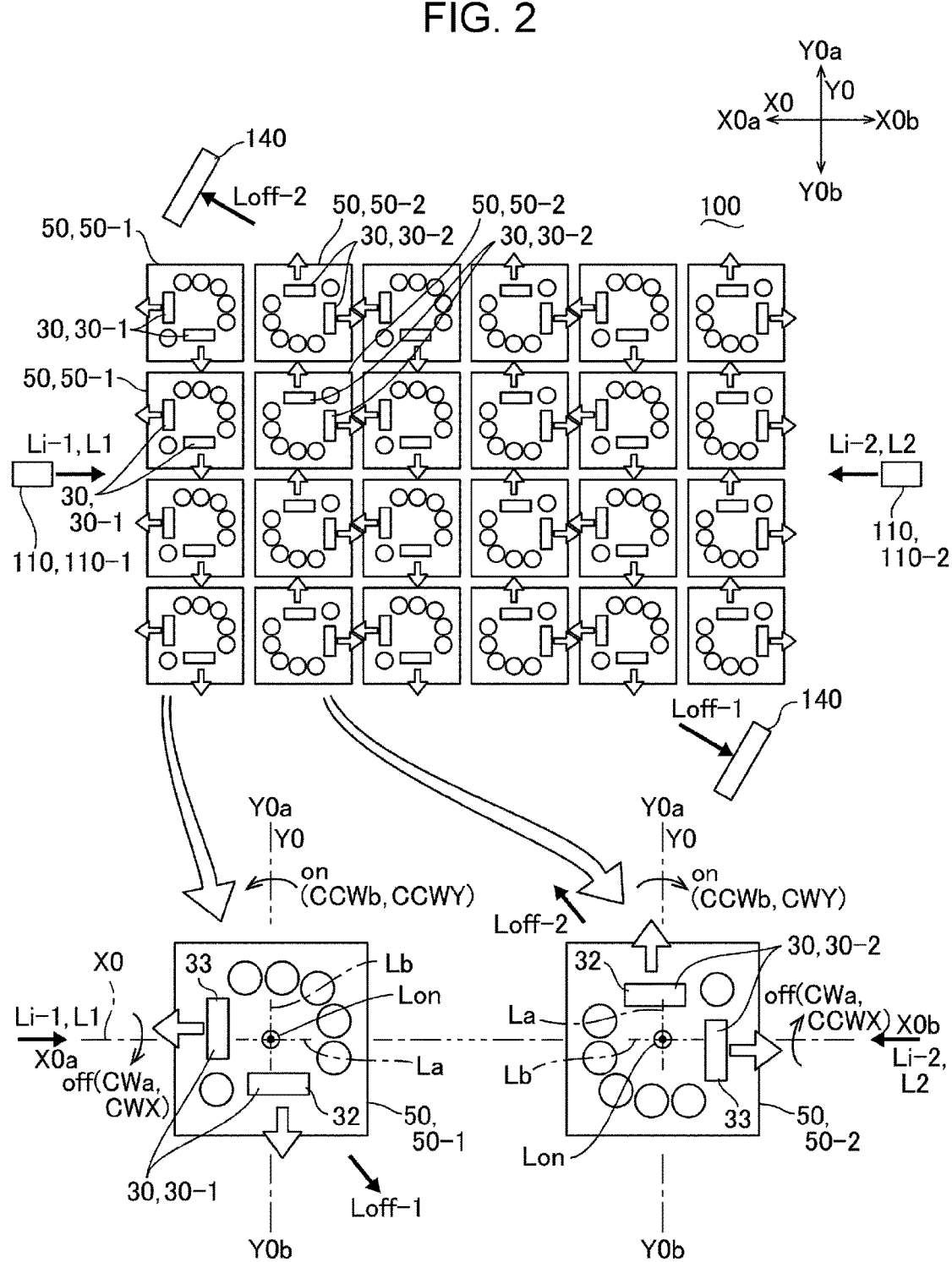
FIG. 2 is a plan view of a configuration of a projection display device according to a first embodiment of the invention.
Figure 3:
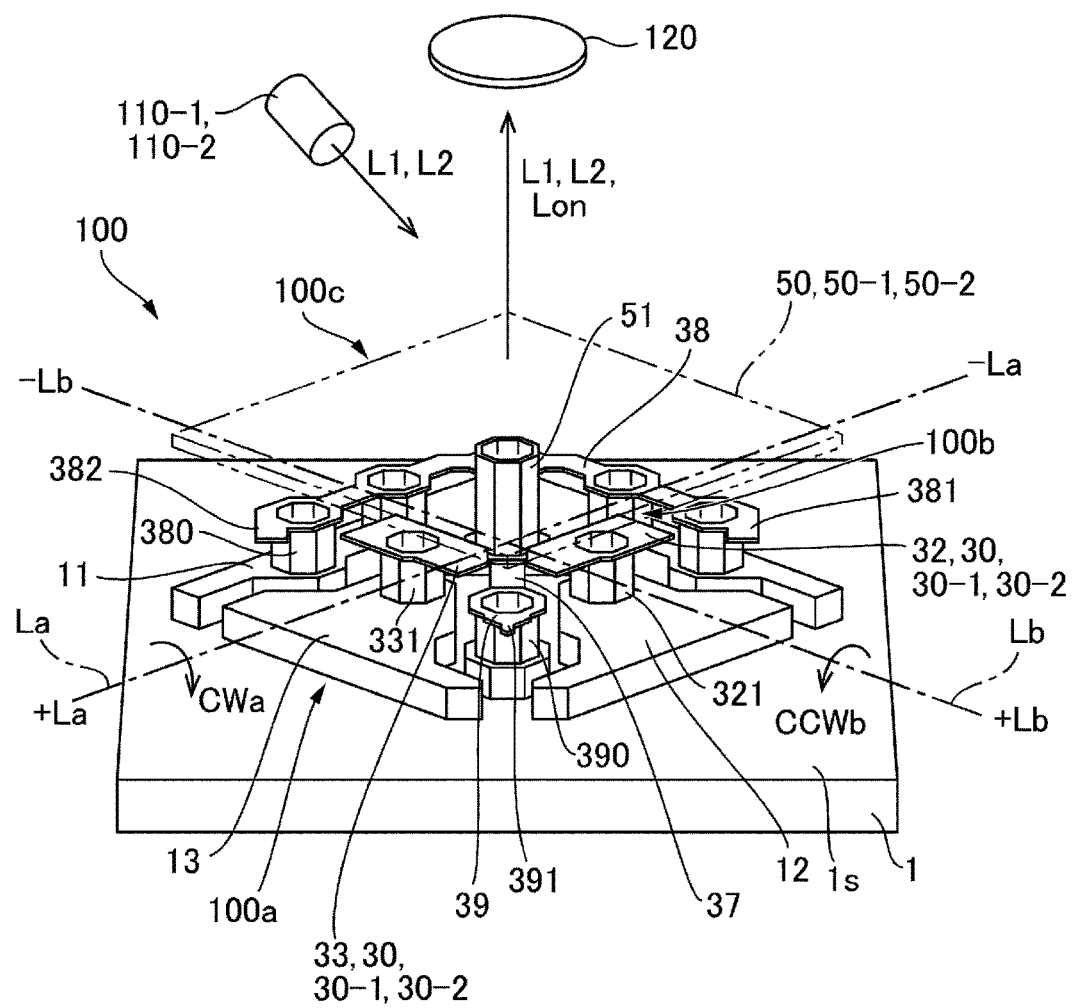
FIG. 3 is an enlarged perspective view of a portion of the electrooptical device illustrated in FIG. 2.
Figure 4:
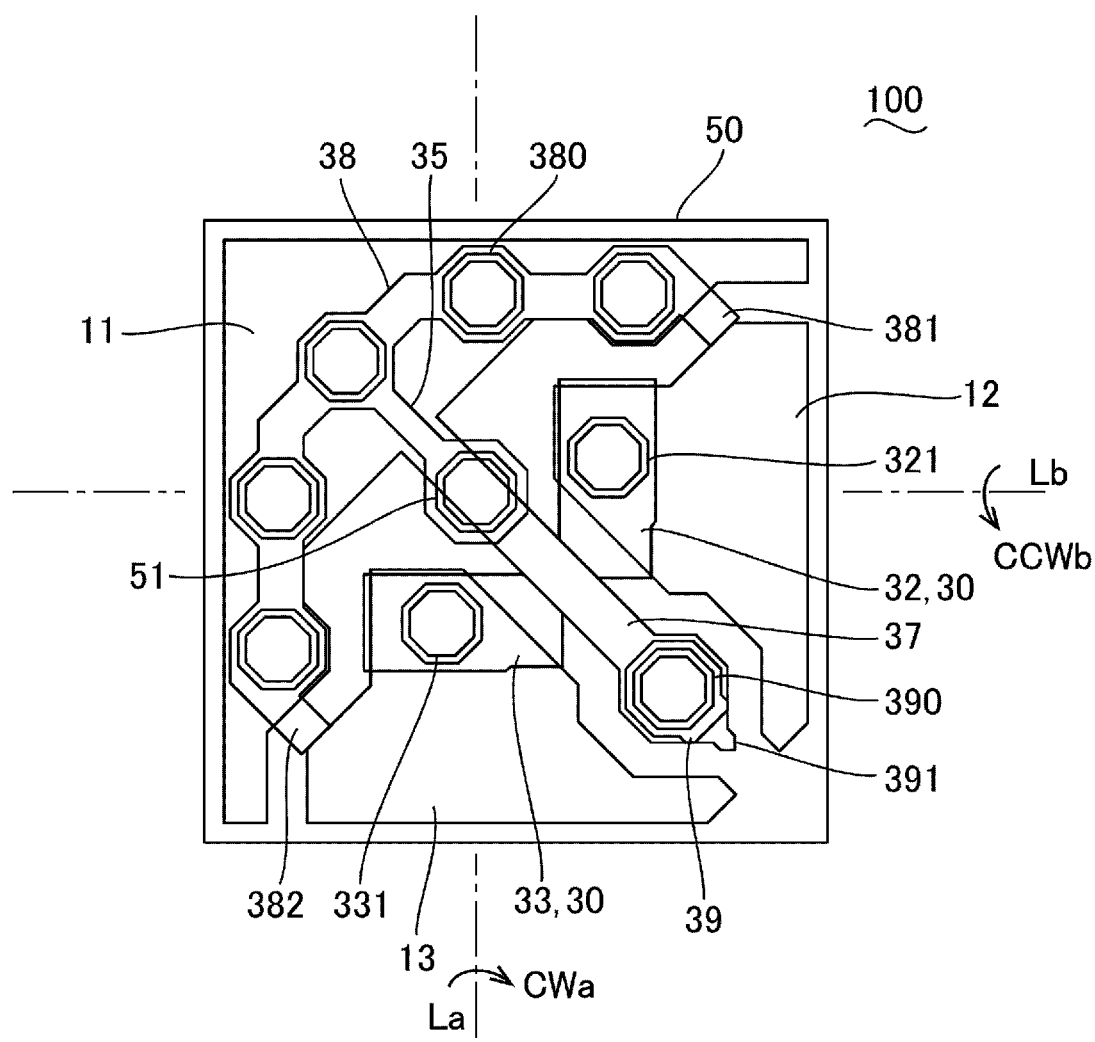
FIG. 4 is a plan view of driving elements and other components illustrated in FIG. 3.
Figure 5:
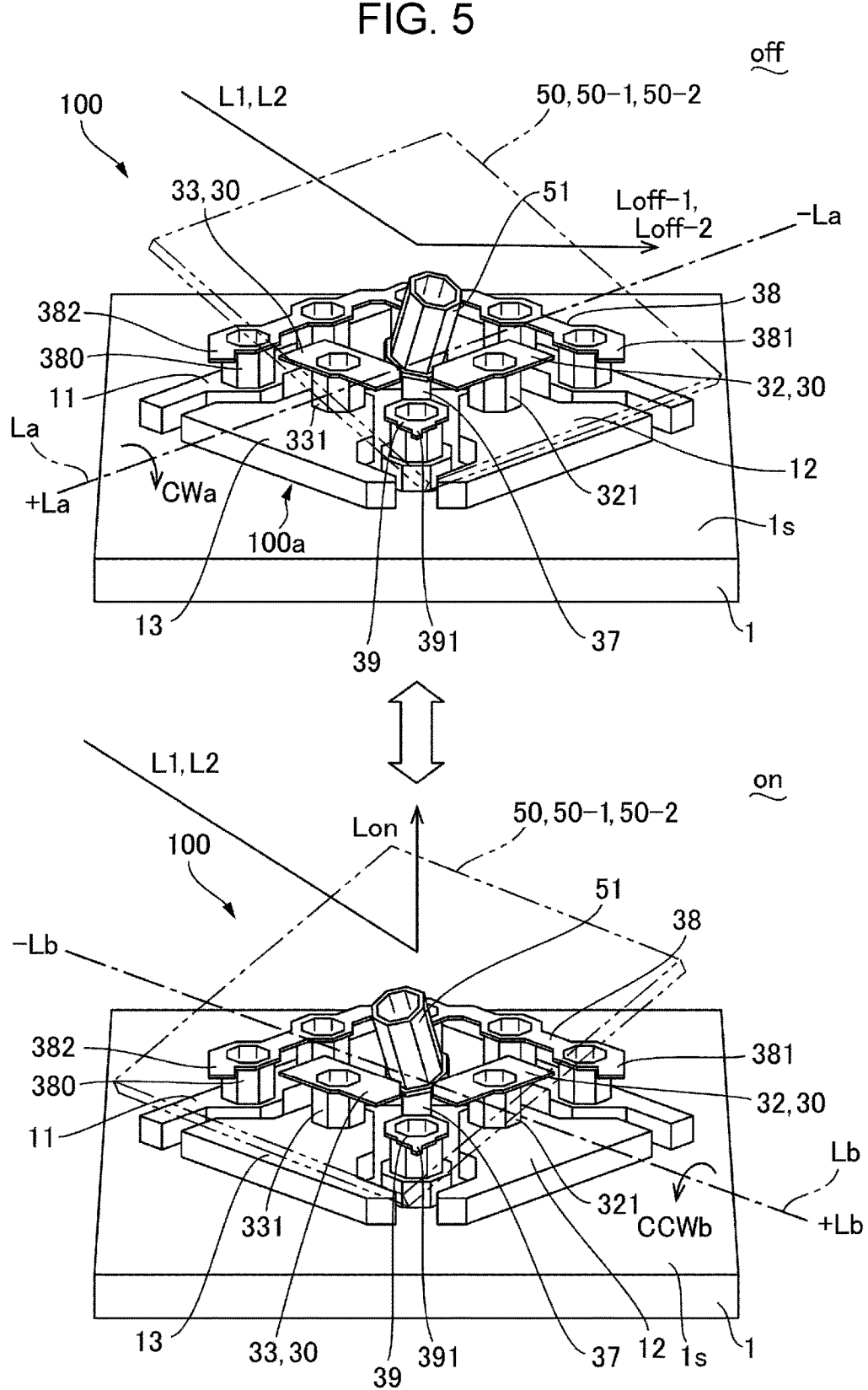
FIG. 5 illustrates a mirror of the electrooptical device illustrated in FIG. 2 while being driven.

FIG. 2 is a plan view of a projection display device 1000 according to a first embodiment of the invention. FIG. 2 also illustrates a first mirror 50-1 and a second mirror 50-2, which are in a state of being driven. FIG. 3 is an enlarged perspective view of a portion of the electrooptical device 100 illustrated in FIG. 2 where the mirror 50 is in a regular position. FIG. 4 is a plan view of components including the driving elements 30 illustrated in FIG. 3. FIG. 5 illustrates a mirror 50 included in the electrooptical device 100 illustrated in FIG. 2 in the state where the mirror 50 is inclined in a first direction CWa around an axis La, and a turn-off position, in which the mirror 50 is inclined in a first direction CCWb around an axis Lb. In FIG. 3 and FIG. 5, the mirror 50 is drawn with two-dot chain lines.

In the electrooptical device 100 of the projection display device 1000 illustrated in FIG. 1, multiple mirrors 50 are arranged in a matrix as illustrated in FIG. 2. Here, the mirrors 50 of the electrooptical device 100 include first mirrors 50-1 and second mirrors 50-2, whose surfaces face in the same direction as the surfaces of the first mirrors 50-1. Thus, the driving elements 30 of the electrooptical device 100 include first driving elements 30-1, which drive the first mirrors 50-1, and second driving elements 30-2, which drive the second mirrors 50-2. In this embodiment, rows of the first mirrors 50-1 arranged in the direction in which the second axis Y0 extends and rows of the second mirrors 50-2 arranged in the direction in which the second axis Y0 extends are alternately arranged side by side in the direction in which the first axis X0 extends.

Here, the first mirrors 50-1 and the second mirrors 50-2 each correspond to the mirror 50 described below with reference to FIG. 3, FIG. 4, and FIG. 5, and are arranged so that their side surfaces have different aspects. The first mirrors 50-1 and the second mirrors 50-2 have the same configuration. The first driving elements 30-1 and the second driving elements 30-2 each correspond to the driving element 30 described below with reference to FIG. 3, FIG. 4, and FIG. 5, and are arranged so that their side surfaces have different aspects in the same manner as the mirror 50. The first driving elements 30-1 and the second driving elements 30-2 have the same configuration.

In the electrooptical device 100 illustrated in FIG. 3 and FIG. 4, each mirror 50 is disposed spaced apart from a first surface is of an element substrate 1. An example of the element substrate 1 is a silicon substrate. Each mirror 50 is a micromirror having a surface whose side length is, for example, 10 to 30 μm. The mirrors 50 are arranged in, for example, a 800×600 array or a 11920×1080 array. The surface of each mirror 50 forms a reflection surface made of a reflective metal layer such as aluminum.

The electrooptical device 100 includes a first-level portion 100*a*, a second-level portion 100*b*, and a third-level portion 100*c*. The first-level portion 100*a* includes substrate bias electrodes 11 and substrate address electrodes 12 and 13 formed on the first surface is of the element substrate 1. The second-level portion 100*b* includes elevated address electrodes 32 and 33, hinges 35, and hinge springs 38. The third-level portion 100*c* includes the mirrors 50. In the first-level portion 100*a*, an address designation circuit, not illustrated, is formed on the first surface is of the element substrate 1. The address designation circuit includes a memory cell, a word line, and a bit line.

The second-level portion 100*b* includes elevated address electrodes 32 and 33, hinges 35, hinge springs 38, and a mirror post 51. The elevated address electrodes 32 and 33 are disposed on both sides of the corresponding hinge 35 and respectively electrically connected to the substrate address electrodes 12 and 13 with electrode support posts 321 and 331 interposed therebetween. Each hinge spring 38 is supported by the corresponding substrate bias electrode 11 with corresponding hinge posts 380 interposed therebetween and electrically connected to the substrate bias electrode 11 with the hinge posts 380 interposed therebetween. Each hinge 35 protrudes from the corresponding hinge springs 38. Each mirror 50 is supported at the end of the corresponding hinge 35 with the corresponding mirror post 51 interposed therebetween. Each mirror 50 is electrically connected to the corresponding hinge springs 38 with the mirror post 51 and the hinge 35 interposed therebetween and is electrically connected to the corresponding substrate bias electrode 11 with the hinge springs 38 and the hinge posts 380 interposed therebetween. Thus, a bias voltage is applied to the mirror 50 from the corresponding substrate bias electrode 11. A center bias electrode 37 extends from the substrate bias electrode 11 so as to be aligned with the hinge 35. An electrode 39, disposed on the same layer as the hinge springs 38, is supported at an end portion of the center bias electrode 37 with an electrode post 390 interposed therebetween. The hinge springs 38 and the electrode 39 respectively include stoppers 381, 382, and 391, with which the mirror 50 comes into contact when it is inclined.

The elevated address electrodes 32 and 33, disposed on both sides of the hinge 35, constitute driving elements 30 that produce electrostatic force between themselves and the mirror 50 to drive the mirror 50 so as to incline the mirror 50. The substrate address electrodes 12 and 13 may also produce electrostatic force between itself and the mirror 50 to drive the mirror 50 so as to incline the mirror 50. In this case, the driving elements 30 are constituted of the elevated address electrodes 32 and 33 and the substrate address electrodes 12 and 13. Each hinge 35 is twisted when a driving voltage is applied to the elevated address electrodes 32 and 33 and the mirror 50 is inclined, as illustrated in FIG. 5, so as to be attracted to the elevated address electrode 32 or the elevated address electrode 33. Each hinge 35 exerts its force of restoration with which the mirror 50 is returned to the regular position parallel to the substrate 1 when the application of the driving voltage to the elevated address electrodes 32 and 33 is stopped and the force of attracting the mirror 50 is thus lost. Thus, the mirror 50 is in the regular position parallel to the element substrate 1 while the driving element 30 stops driving the mirror 50.

In the electrooptical device 100 having the above-described configuration, the potentials of the mirror 50, the elevated address electrode 32, and the elevated address electrode 33 are controlled so that electrostatic force is produced between the elevated address electrodes 32 and 33 and the mirror 50, so that the hinge 35 is twisted. Thus, the mirror 50 can take the turn-off position, in which the mirror 50 is inclined in the first direction CWa around the axis La, and the turn-on position, in which the mirror 50 is inclined in the first direction CCWb around the axis Lb, as illustrated in FIG. 5. Here, the axis Lb is an axis parallel to the mirror 50 in the regular position and the axis La is an axis parallel to the mirror 50 in the regular position and extending in the direction perpendicular to the axis Lb.

Configuration of Mirrors Including First Mirror 50-1 and Second Mirror 50-2

As illustrated in FIG. 1, the optical projection system 120 is disposed at a position perpendicular to the mirror 50 (first mirror 50-1 and second mirror 50-2) in the regular position that the mirror 50 takes after an application of a driving voltage to the driving element 30 (elevated address electrodes 32 and 33) is stopped. The direction from the mirror 50 (first mirror 50-1 and second mirror 50-2) toward the optical projection system 120 is an ON-direction Lon.

As illustrated in FIG. 2, in this embodiment, the electrooptical device 100 includes the first mirrors 50-1 and the second mirrors 50-2 arranged so that their surfaces face in the direction the same as the direction in which a surface of the first mirrors 50-1 face. Here, the first mirrors 50-1 and the second mirrors 50-2 each correspond to the mirror 50 described with reference to FIG. 2, FIG. 3, FIG. 4, and FIG. 5 and have different positions and different aspects from each other. The first mirrors 50-1 and the second mirrors 50-2 basically have the same configuration. Hereinbelow, the axis parallel to the mirror (first mirror 50-1 and second mirror 50-2) in the regular position is referred to as a first axis X0 and an axis parallel to the mirror 50 in the regular position and crossing the first axis X0 is referred to as a second axis Y0.

More specifically, the first mirror 50-1 and the first driving elements 30-1 are arranged in such a manner that the mirror 50 and the driving elements 30 described with reference to FIG. 3, FIG. 4, and FIG. 5 are arranged so that the axis La extends along the first axis X0 and the axis Lb extends along the second axis Y0. On the other hand, the second mirror 50-2 and the second driving elements 30-2 are arranged in such a manner that the mirror 50 and the driving elements 30 described with reference to FIG. 3, FIG. 4, and FIG. 5 are arranged so that the axis La extends along the second axis Y0 and the axis Lb extends along the first axis X0. Here, however, the direction in which the first driving elements 30-1 swing the first mirror 50-1 from the regular position (swing direction) differs from the direction in which the second driving elements 30-2 swing the second mirror 50-2 from the regular position (swing direction).

The first light-emitting unit 110-1 is disposed on a first side X0a of the direction in which the first axis X0 extends (or the direction of first axis X0). A first irradiation direction Li-1 is a direction from the first side X0a toward a second side X0b of the direction in which the first axis X0 extends. On the other hand, the second light-emitting unit 110-2 is disposed on the second side X0b of the direction in which the first axis X0 extends. A second irradiation direction Li-2 is a direction from the second side X0b to the first side X0a of the direction in which the first axis X0 extends.

When the first light-emitting unit 110-1 emits the first light-source light beam L1, the first driving elements 30-1 swing the first mirror 50-1 in a first direction CCWY around the second axis Y0 so that the first mirror 50-1 takes a first turn-on position, in which the first mirror 50-1 is inclined toward the first side X0a of the direction in which the first axis X0 extends. At this time, the first mirror 50-1 reflects the first light-source light beam L1 in the ON-direction Lon toward the optical projection system 120. On the other hand, when the first driving elements 30-1 swing the first mirror 50-1 in a first direction CWX around the first axis X0 so that the first mirror 50-1 takes a first turn-off position, in which the first mirror 50-1 is inclined toward a second side Y0b of the direction in which the second axis Y0 extends (direction of second axis Y0), the first mirror 50-1 reflects the first light-source light beam L1 in a direction that is toward the second side X0b of the direction in which the first axis X0 extends and the second side Y0b of the direction in which the second axis Y0 extends (first OFF-direction Loff-1). Here, a first light absorption device 140-1 is disposed in the first OFF-direction Loff-1. Thus, the first light-source light beam L1 reflected in the first OFF-direction Loff-1 is absorbed by the first light absorption device 140-1. Thus, controlling the turn-on position and the turn-off position of each of the multiple first mirrors 50-1 allows the first light-source light beam L1 to be modulated into a first modulated light beam and the first modulated light beam to be reflected to the optical projection system 120. During this reflection, the multiple second mirrors 50-2 take either the second turn-on position, in which the second mirrors 50-2 are inclined toward the second side X0b of the direction in which the first axis X0 extends, or the second turn-off position, in which the second mirrors 50-2 are inclined toward the first side Y0a of the direction in which the second axis Y0 extends, as described below. Thus, the first light-source light beam L1 is never reflected by any of the second mirrors 50-2 in the ON-direction Lon.

On the other hand, when the second light-emitting unit 110-2 emits the second light-source light beam L2, the second driving elements 30-2 swing the second mirror 50-2 in the second direction CWY around the second axis Y0 so that the second mirror 50-2 takes the second turn-on position, in which the second mirror 50-2 is inclined toward the second side X0b of the direction in which the first axis X0 extends. At this time, the second mirror 50-2 reflects the second light-source light beam L2 in the ON-direction Lon toward the optical projection system 120. On the other hand, when the second driving elements 30-2 swing the second mirror 50-2 in the second direction CCWX around the first axis X0 so that the second mirror 50-2 takes the second turn-off position, in which the second mirror 50-2 is inclined toward the first side Y0a of the direction in which the second axis Y0 extends, the second mirror 50-2 reflects the second light-source light beam L2 in a direction that is toward the first side X0a of the direction in which the first axis X0 extends and the first side Y0a of the direction in which the second axis Y0 extends (second OFF-direction Loff-2). Here, a second light absorption device 140-2 is disposed in the second OFF-direction Loff-2. Thus, the second light-source light beam L2 reflected in the second OFF-direction Loff-2 is absorbed by the second light absorption device 140-2. Thus, controlling the turn-on position and the turn-off position of each of the multiple second mirrors 50-2 allows the second light-source light beam L2 to be modulated into a second modulated light beam and the second modulated light beam to be reflected to the optical projection system 120. During this reflection, the multiple first mirrors 50-1 take either the first turn-on position, in which the first mirrors 50-1 are inclined toward the first side X0a of the direction in which the first axis X0 extends, or the first turn-off position, in which the first mirrors 50-1 are inclined toward the second side Y0b of the direction in which the second axis Y0 extends, as described above. Thus, the second light-source light beam L2 is never reflected by any of the first mirrors 50-1 in the ON-direction Lon.

Main Effects of Embodiment

As described, in this embodiment, the first driving elements 30-1 swing the first mirror 50-1 in the regular position in the first direction CWX around the first axis X0 so that the first mirror 50-1 takes one of the first turn-on position and the first turn-off position and swing the first mirror 50-1 in the regular position in the first direction CCWY around the second axis Y0 so that the first mirror 50-1 takes the other one of the first turn-on position and the first turn-off position. The second driving elements 30-2 swing the second mirror 50-2 in the second direction CCWX around the first axis X0 so that the second mirror 50-2 takes one of the second turn-on position and the second turn-off position and swing the second mirror 50-2 in the second direction CWY around the second axis Y0 so that the second mirror 50-2 takes the other one of the second turn-on position and the second turn-off position. Here, the direction in which the first driving elements 30-1 swing the first mirror 50-1 from its regular position is different from the direction in which the second driving elements 30-2 swing the second mirror 50-2 from its regular position. Thus, when the first mirror 50-1 projects a first modulated light beam, into which the first light-source light beam L1 is modulated, and the second mirror 50-2 projects a second modulated light beam, into which the second light-source light beam L2 is modulated, toward the object 200 through the optical projection system 120, an image obtained by synthesizing modulated light into which the first light-source light beam L1 is modulated and modulated light into which the second light-source light beam L2 is modulated is projected on the object 200.

First Specific Example of First Light-Source Light Beam L1 and Second Light-Source Light Beam L2

Figures 6, 7, 8:
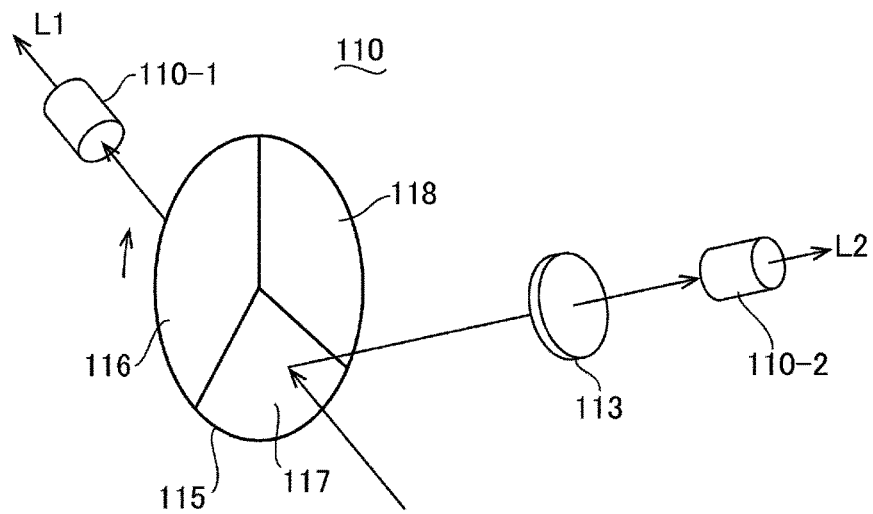
FIG. 6 illustrates first specific examples of a first light-source light beam and a second light-source light beam used in the projection display device illustrated in FIG. 1.
FIG. 7 illustrates second specific examples of a first light-source light beam and a second light-source light beam used in the projection display device illustrated in FIG. 1.
FIG. 8 illustrates a configuration of a light-source unit that generates a first light-source light beam and a second light-source light beam illustrated in FIG. 7.

FIG. 6 illustrates first specific examples of the first light-source light beam L1 and the second light-source light beam L2 used in the projection display device 1000 illustrated in FIG. 1. As illustrated in FIG. 6, in this embodiment, each of the first light-source light beam L1 and the second light-source light beam L2 is sequentially switched between a first wavelength range light beam L(R), a second wavelength range light beam L(G), corresponding to a wavelength range different from the first wavelength range, and a third wavelength range light beam L(B), corresponding to a wavelength range different from the first wavelength range and the second wavelength range. Light beams in the same wavelength range are cycled at different timing between the first light-source light beam L1 and the second light-source light beam L2. For example, the first light-source light beam L1 is switched in sequence of the light beams L(R), L(G), L(B), and L(R) in order of time periods t1, t2, t3, and t4, whereas the second light-source light beam L2 is switched in sequence of the light beams L(G), L(B), L(R), and L(G) in order of time periods t1, t2, t3, and t4. This configuration can thus prevent color breakup of a color image displayed in a sequential manner.

Second Specific Example of First Light-Source Light Beam L1 and Second Light-Source Light Beam L2

FIG. 7 illustrates a second specific example of the first light-source light beam L1 and the second light-source light beam L2 used in the projection display device 1000 illustrated in FIG. 1. FIG. 8 illustrates the configuration of the light-source unit 110 that produces the first light-source light beam L1 and the second light-source light beam L2 illustrated in FIG. 7.

As illustrated in FIG. 7, in this embodiment, each of the first light-source light beam L1 and the second light-source light beam L2 is sequentially switched between a first wavelength range light beam L(R), a second wavelength range light beam L(G), corresponding to a wavelength range different from the first wavelength range, and a third wavelength range light beam L(B), corresponding to a wavelength range different from the first wavelength range and the second wavelength range. Light beams in the same wavelength range are cycled at different timing between the first light-source light beam L1 and the second light-source light beam L2. During a period where the first light-source light beam L1 is one of the wavelength range light beams L(R), L(G), and L(B), the second light-source light beam L2 is sequentially switched between the other two wavelength range light beams. For example, the first light-source light beam L1 is the light beam L(R) in the time period t1, whereas the second light-source light beam L2 is the light beam L(G) in a first half t1-1 of the time period t1 and then switched to the light beam L(B) in a second half t1-2 of the time period t1. In addition, the first light-source light beam L1 is the light beam L(G) in the time period t2, whereas the second light-source light beam L2 is the light beam L(B) in a first half t2-1 of the time period t2 and then switched to the light beam L(R) in a second half t2-2 of the time period t2. This configuration can thus prevent color breakup of a color image displayed in a sequential manner.

This configuration can be embodied in the light-source unit 110 including, as illustrated in FIG. 8, for example, a white light source, not illustrated, a color wheel 115, and a color separating device 113. The color wheel 115 includes a first area 116, which transmits a first wavelength range light beam, a second area 117, which transmits a second wavelength range light beam, and a third area 118, which transmits a third wavelength range light beam. The color separating device 113 operates in association with rotation of the color wheel 115 and an example of which is a color shutter. Here, the first light-source light beam L1 is a light beam emitted from the first light-emitting unit 110-1 through the color wheel 115. On the other hand, the second light-source light beam L2 is a light beam obtained by separating light reflected by the color wheel 115 using the color separating device 113 and emitted from the second light-emitting unit 110-2.

Third Specific Example of First Light-Source Light Beam L1 and Second Light-Source Light Beam L2

In this example, the first light-source light beam L1 is a first coherent light beam and the second light-source light beam L2 is a second coherent light beam having a phase opposite to that of the first coherent light beam. Here, the term "coherent light" refers to light including light in a state approximate to the state of coherent light, such as light emitted from a laser that oscillates in a single mode. This configuration is advantageous in that it is less likely to allow light beams emitted from a first mirror 50-1 and a second mirror 50-2, which are adjacent to each other, to interfere with each other.

Fourth Specific Example of First Light-Source Light Beam L1 and Second Light-Source Light Beam L2

In this example, the first light-source light beam L1 is a first linearly polarized light beam and the second light-source light beam L2 is a second linearly polarized light beam whose plane of polarization is orthogonal to that of the first linearly polarized light beam. This configuration can project three-dimensional images using light beams emitted from the first mirrors 50-1 and the second mirrors 50-2, so that a user can visually recognize a three-dimensional image using a device such as polarized glasses.

Second Embodiment

Figure 9:
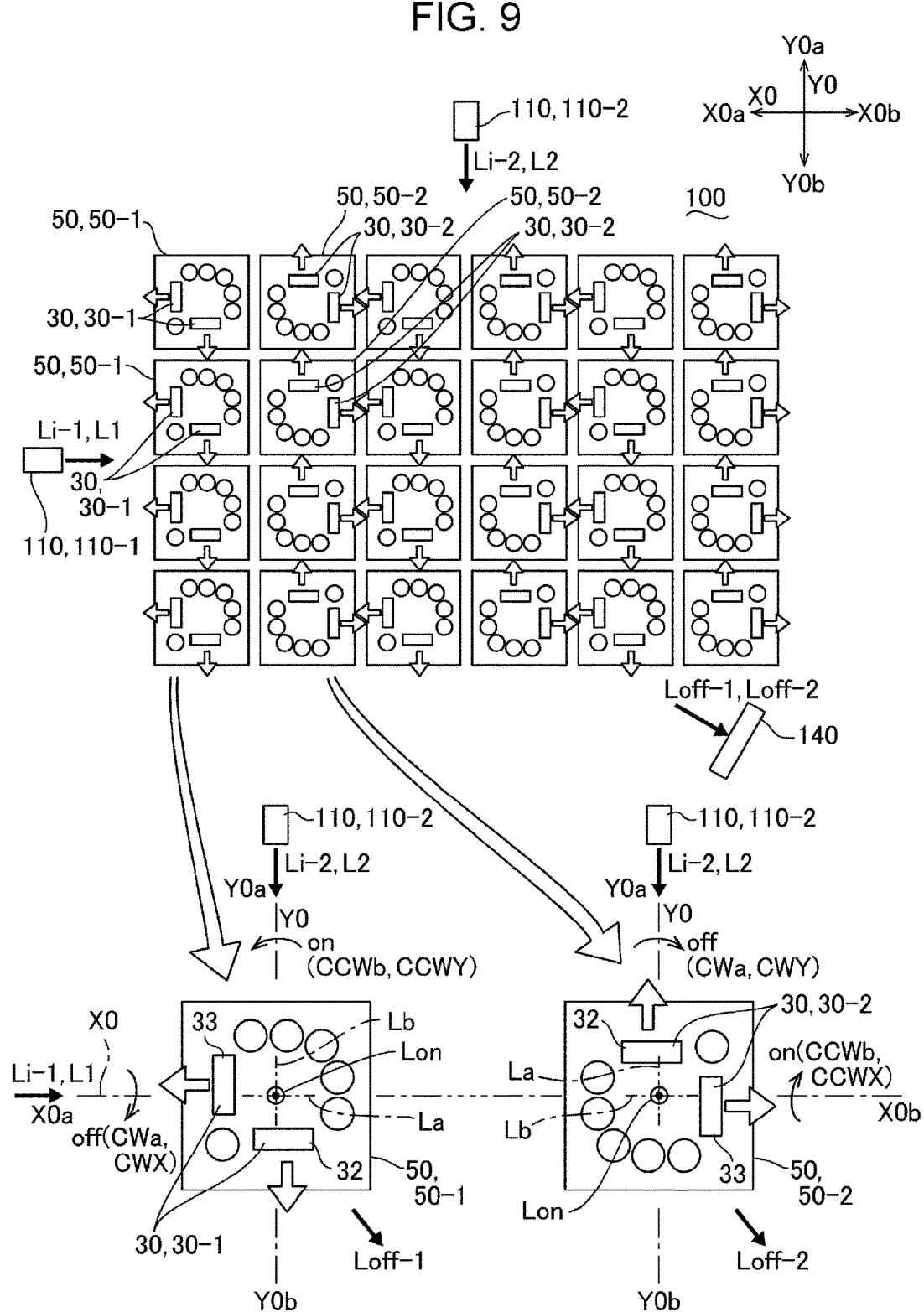
FIG. 9 is a plan view of a configuration of a projection display device according to a second embodiment of the invention.

FIG. 9 is a plan view of a projection display device 1000 according to the second embodiment of the invention. FIG. 9 illustrates the first mirrors 50-1 and the second mirrors 50-2 while they are driven. The basic configuration of the embodiment is the same as that according to the first embodiment. Thus, components the same as those in the first embodiment are denoted with the same reference symbols and are not described here.

As illustrated in FIG. 9 in the electrooptical device 100 according to this embodiment, as in the case of the first embodiment, the mirrors 50 include first mirrors 50-1 and second mirrors 50-2, whose surfaces face in the same direction as the surfaces of the first mirrors 50-1. Here, the first mirrors 50-1 and the second mirrors 50-2 each correspond to the mirror 50 described with reference to FIG. 3, FIG. 4, and FIG. 5, and are arranged at different positions and aspects. The first mirrors 50-1 and the second mirrors 50-2 have basically the same configuration. More specifically, each first mirror 50-1 and the corresponding first driving elements 30-1 correspond to the mirror 50 and the driving elements 30 described with reference to FIG. 3, FIG. 4, and FIG. 5 and are arranged so that the axis La extends along the first axis X0 and the axis Lb extends along the second axis Y0. On the other hand, each second mirror 50-2 and the corresponding second driving elements 30-2 correspond to the mirror 50 and the driving elements 30 described with reference to FIG. 3, FIG. 4, and FIG. 5 and are arranged so that the axis La extends along the second axis Y0 and the axis Lb extends along the first axis X0.

Also in this embodiment, as in the case of the first embodiment, the optical projection system 120 is disposed in a direction perpendicular to the mirrors 50 (first mirrors 50-1 and second mirrors 50-2) when the mirrors 50 are in the regular position in which an application of a driving voltage to the driving elements 30 (elevated address electrodes 32 and 33) is stopped. The direction from the mirrors 50 (first mirrors 50-1 and second mirrors 50-2) toward the optical projection system 120 is an ON-direction. Also in this embodiment as in the case of the first embodiment, the first irradiation direction Li-1 and the second irradiation direction Li-2 are different directions. More specifically, as in the case of the first embodiment, the first light-emitting unit 110-1 is disposed on the first side X0a of the direction in which the first axis X0 extends and the first irradiation direction Li-1 is a direction from the first side X0a to the second side X0b of the direction in which the first axis X0 extends. On the other hand, the second light-emitting unit 110-2 is disposed on the first side Y0a of the direction in which the second axis Y0 extends unlike in the case of the first embodiment. The second irradiation direction Li-2 is a direction from the first side Y0a to the second side Y0b of the direction in which the second axis Y0 extends.

In the electrooptical device 100 having the above-described configuration, when the first light-emitting unit 110-1 emits the first light-source light beam L1, the first mirror 50-1 is caused to swing in the first direction CCWY around the second axis Y0 so that the first mirror 50-1 takes a first turn-on position, in which the first mirror 50-1 is inclined toward the first side X0a of the direction in which the first axis X0 extends. At this time, the first mirror 50-1 reflects the first light-source light beam L1 in the ON-direction Lon toward the optical projection system 120. On the other hand, when the first mirror 50-1 is caused to swing in the first direction CWX around the first axis X0 so that the first mirror 50-1 takes a first turn-off position, in which the first mirror 50-1 is inclined toward the second side Y0b of the direction in which the second axis Y0 extends, the first mirror 50-1 reflects the first light-source light beam L1 in a direction that is toward the second side X0b of the direction in which the first axis X0 extends and the second side Y0b of the direction in which the second axis Y0 extends (first OFF-direction Loff-1). Here, a light absorption device 140 is disposed in the first OFF-direction Loff-1. Thus, the first light-source light beam L1 reflected in the first OFF-direction Loff-1 is absorbed by the light absorption device 140. Thus, controlling the turn-on position and the turn-off position of each of the multiple first mirrors 50-1 allows the first light-source light beam L1 to be modulated into a first modulated light beam and the first modulated light beam to be reflected to the optical projection system 120. During this reflection, the multiple second mirrors 50-2 take either the second turn-on position, in which the second mirrors 50-2 are inclined toward the first side Y0a of the direction in which the second axis Y0 extends, or the second turn-off position, in which the second mirrors 50-2 are inclined toward the second side X0b of the direction in which the first axis X0 extends, as described below. Thus, the first light-source light beam L1 is never reflected by any of the second mirrors 50-2 in the ON-direction Lon.

On the other hand, when the second light-emitting unit 110-2 emits the second light-source light beam L2, the second mirror 50-2 is caused to swing in the second direction CCWX around the first axis X0 so that the second mirror 50-2 takes the second turn-on position, in which the second mirror 50-2 is inclined toward the first side Y0a of the direction in which the second axis Y0 extends. At this time, the second mirror 50-2 reflects the second light-source light beam L2 in the ON-direction Lon toward the optical projection system 120. On the other hand, when the second mirror 50-2 is caused to swing in the second direction CWY around the second axis Y0 so that the second mirror 50-2 takes the second turn-off position, in which the second mirror 50-2 is inclined toward the second side X0b of the direction in which the first axis X0 extends, the second mirror 50-2 reflects the second light-source light beam L2 in a direction that is toward the second side X0b of the direction in which the first axis X0 extends and the second side Y0b of the direction in which the second axis Y0 extends (second OFF-direction Loff-2). Here, the second OFF-direction Loff-2 is identical to the first OFF-direction Loff-1 and the light absorption device 140 is disposed in the first OFF-direction Loff-1 or the second OFF-direction Loff-2. Thus, the second light-source light beam L2 reflected in the second OFF-direction Loff-2 is absorbed by the light absorption device 140. Thus, controlling the turn-on position and the turn-off position of each of the multiple second mirrors 50-2 allows the second light-source light beam L2 to be modulated and the modulated light to be reflected to the optical projection system 120. During this reflection, the multiple first mirrors 50-1 take either the first turn-on position, in which the first mirrors 50-1 are inclined toward the first side X0a of the direction in which the first axis X0 extends, or the first turn-off position, in which the first mirrors 50-1 are inclined toward the second side Y0b of the direction in which the second axis Y0 extends, as described above. Thus, the second light-source light beam L2 is never reflected by any of the first mirrors 50-1 in the ON-direction Lon.

As described, in this embodiment, the first driving elements 30-1 swing the first mirror 50-1 in the regular position in the first direction CWX around the first axis X0 so that the first mirror 50-1 takes one of the first turn-on position and the first turn-off position and swing the first mirror 50-1 in the regular position in the first direction CCWY around the second axis Y0 so that the first mirror 50-1 takes the other one of the first turn-on position and the first turn-off position. The second driving elements 30-2 swing the second mirror 50-2 in the second direction CCWX around the first axis X0 so that the second mirror 50-2 takes one of the second turn-on position and the second turn-off position and swing the second mirror 50-2 in the second direction CWY around the second axis Y0 so that the second mirror 50-2 takes the other one of the second turn-on position and the second turn-off position. Here, the direction in which the first driving elements 30-1 swing the first mirror 50-1 from its regular position is different from the direction in which the second driving elements 30-2 swing the second mirror 50-2 from its regular position. Thus, when the first mirror 50-1 projects modulated light into which the first light-source light beam L1 is modulated and the second mirror 50-2 projects modulated light into which the second light-source light beam L2 is modulated toward the object 200 through the optical projection system 120, an image obtained by synthesizing the modulated light into which the first light-source light beam L1 is modulated and the modulated light into which the second light-source light beam L2 is modulated is projected on the object 200.

In addition, in this embodiment, the first OFF-direction Loff-1 is identical to the second OFF-direction Loff-2. Thus, light beams reflected in the first OFF-direction Loff-1 and in the second OFF-direction Loff-2 can be absorbed by the common light absorption device 140. This configuration thus facilitates an appropriate arrangement of each component.

Other Embodiments

In this embodiment, each first mirror 50-1, each second mirror 50-2, the corresponding first driving elements 30-1, and the corresponding second driving elements 30-2 are arranged in such a manner that the driving elements 30, which swing the mirrors 50 around two axes La and Lb, are disposed at different positions (aspects) between the first mirror 50-1 and the second mirror 50-2. However, the axes around which each first mirror 50-1 and each second mirror 50-2 is caused to swing may be varied by changing the positions (aspects) of the driving elements 30 that each swing the first mirror 50-1 or the second mirror 50-2 around a single axis.

The entire disclosures of Japan Patent Application No.: 2016-148117, filed Jul. 28, 2016 is expressly incorporated by reference herein.

What is claimed is:

1. A projection display device, comprising:
   an electrooptical device;
   a light-source unit that emits a first light-source light beam to the electrooptical device in a first irradiation direction and emits a second light-source light beam to the electrooptical device in a second irradiation direction different from the first irradiation direction; and
   an optical projection system that projects a first modulated light beam, into which the first light-source light beam is modulated by the electrooptical device, and a second modulated light beam, into which the second light-source light beam is modulated by the electrooptical device,
   wherein the electrooptical device includes
      a first mirror that modulates light,
      a first driving element that swings the first mirror to switch a position of the first mirror,
      a second mirror that is disposed so that a surface of the second mirror faces in a direction the same as a direction in which a surface of the first mirror faces and that modulates light, and
      a second driving element that swings the second mirror to switch a position of the second mirror,
   wherein the first driving element switches the position of the first mirror between a first turn-on position, in which the first mirror reflects the first light-source light beam in an ON-direction toward the optical projection system, and a first turn-off position, in which the first mirror reflects the first light-source light beam in a first OFF-direction, the first OFF-direction being different from the ON-direction, the first irradiation direction, and the second irradiation direction, and
   wherein the second driving element swings the second mirror in a direction different from the direction in which the first mirror is caused to swing to switch the position of the second mirror between a second turn-on position, in which the second mirror reflects the second light-source light beam in the ON-direction, and a second turn-off position, in which the second mirror reflects the second light-source light beam in a second OFF-direction, the second OFF-direction being different from the ON-direction, the first irradiation direction, and the second irradiation direction.

2. The projection display device according to claim 1, wherein the first light-source light beam is a first coherent light beam, and
   wherein the second light-source light beam is a second coherent light beam having a phase opposite to a phase of the first coherent light beam.

3. The projection display device according to claim 1, wherein the first light-source light beam is a first linearly polarized light beam, and
   wherein the second light-source light beam is a second linearly polarized light beam whose plane of polarization is orthogonal to a plane of polarization of the first linearly polarized light beam.

4. The projection display device according to claim 1, wherein the ON-direction is perpendicular to the first mirror when the first mirror is in a regular position in which the first mirror is stopped being driven by the first driving element, and
   wherein the first irradiation direction and the second irradiation direction are inclined with respect to the ON-direction.

5. The projection display device according to claim 4, wherein the first driving element swings the first mirror in a first direction around a first axis, parallel to the first mirror in the regular position, so that the first mirror takes one of the first turn-on position and the first turn-off position and swings the first mirror in a first direction around a second axis, parallel to the first mirror in the regular position and crossing the first axis, so that the first mirror takes the other one of the first turn-on position and the first turn-off position, and
   wherein the second driving element swings the second mirror in a second direction around the first axis so that the second mirror takes one of the second turn-on position and the second turn-off position and swings the second mirror in a second direction around the second axis so that the second mirror takes the other one of the second turn-on position and the second turn-off position.

6. The projection display device according to claim 5, wherein the first irradiation direction is a direction from a first side toward a second side of a direction of the first axis,
   wherein the second irradiation direction is a direction from the second side toward the first side of the direction of the first axis,
   wherein the first driving element swings the first mirror in the first direction around the second axis so that the first mirror takes the first turn-on position and swings the first mirror in the first direction around the first axis so that the first mirror takes the first turn-off position, and
   wherein the second driving element swings the second mirror in the second direction around the second axis so that the second mirror takes the second turn-on position and swings the second mirror in the second direction around the first axis so that the second mirror takes the second turn-off position.

7. The projection display device according to claim 5, wherein the first irradiation direction is a direction from a first side toward a second side of a direction of the first axis,
   wherein the second irradiation direction is a direction from a first side toward a second side of a direction of the second axis,
   wherein the first driving element swings the first mirror in the first direction around the second axis so that the first mirror takes the first turn-on position and swings the first mirror in the first direction around the first axis so that the first mirror takes the first turn-off position, and
   wherein the second driving element swings the second mirror in the second direction around the first axis so that the second mirror takes the second turn-on position and swings the second mirror in the second direction around the second axis so that the second mirror takes the second turn-off position.

8. The projection display device according to claim 1,
wherein each of the first light-source light beam and the second light-source light beam is sequentially switched between a light beam in a first wavelength range, a light beam in a second wavelength range, different from the first wavelength range, and a light beam in a third wavelength range, different from the first wavelength range and the second wavelength range, and
wherein light beams in the same wavelength range are cycled at different timing between the first light-source light beam and the second light-source light beam.

9. The projection display device according to claim 8,
wherein during a period where the first light-source light beam is a light beam in any one of the first wavelength range, the second wavelength range, and the third wavelength range, the second light-source light beam is sequentially switched from one light beam to another in the other wavelength ranges.

10. The projection display device according to claim 9,
wherein the light-source unit includes a white light source, a color wheel, and a color separating device, the color wheel including a first area that transmits the light beam in the first wavelength range, a second area that transmits the light beam in the second wavelength range, and a third area that transmits the light beam in the third wavelength range, the color separating device operating in association with a rotation of the color wheel,
wherein the first light-source light beam is a light beam that has transmitted through the color wheel, and
wherein the second light-source light beam is a light beam obtained by separating a light beam that has been reflected by the color wheel using the color separating device.

11. An electrooptical device, comprising:
a first mirror that modulates light;
a first driving element that swings the first mirror to switch a position of the first mirror;
a second mirror that is disposed so that a surface of the second mirror faces in a direction the same as a direction in which a surface of the first mirror faces and that modulates light; and
a second driving element that swings the second mirror in a direction different from a direction in which the first mirror is caused to swing to switch a position of the second mirror.

12. The electrooptical device according to claim 11,
wherein the first driving element swings the first mirror in a first direction around a first axis, parallel to the first mirror in a regular position in which the first mirror is stopped being driven by the first driving element, so that the first mirror takes one of a first turn-on position and a first turn-off position, and swings the first mirror in a first direction around a second axis, parallel to the first mirror in the regular position and crossing the first axis, so that the first mirror takes the other one of the first turn-on position and the first turn-off position, and
wherein the second driving element swings the second mirror in a second direction around the first axis so that the second mirror takes one of a second turn-on position and a second turn-off position and swings the second mirror in a second direction around the second axis so that the second mirror takes the other one of the second turn-on position and the second turn-off position.

* * * * *